Sept. 24, 1963 W. G. McKENZIE 3,104,899
PLASTIC FITTING WITH METALLIC TUBING GRIPPING ELEMENT
Filed Feb. 8, 1960
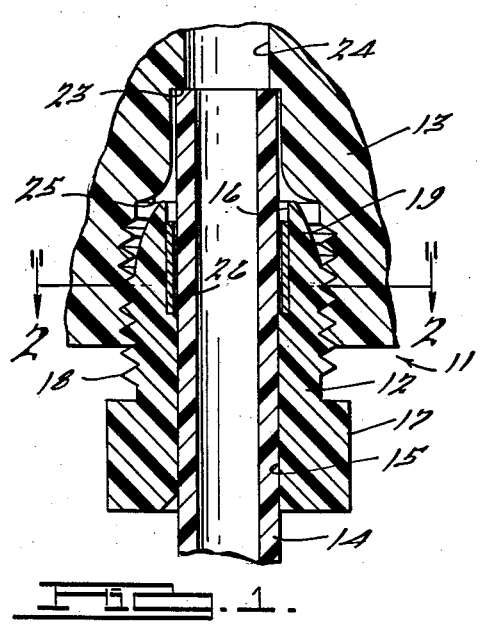
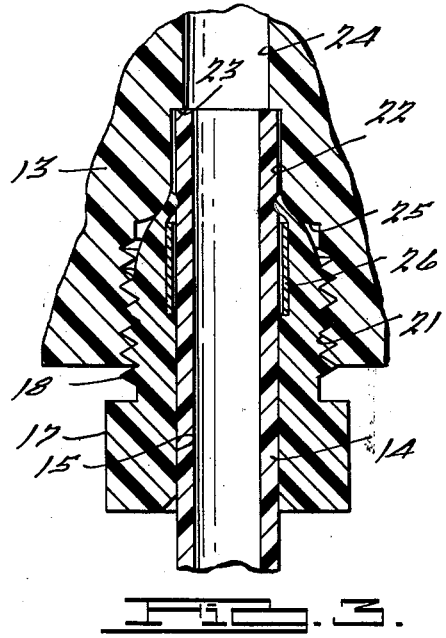
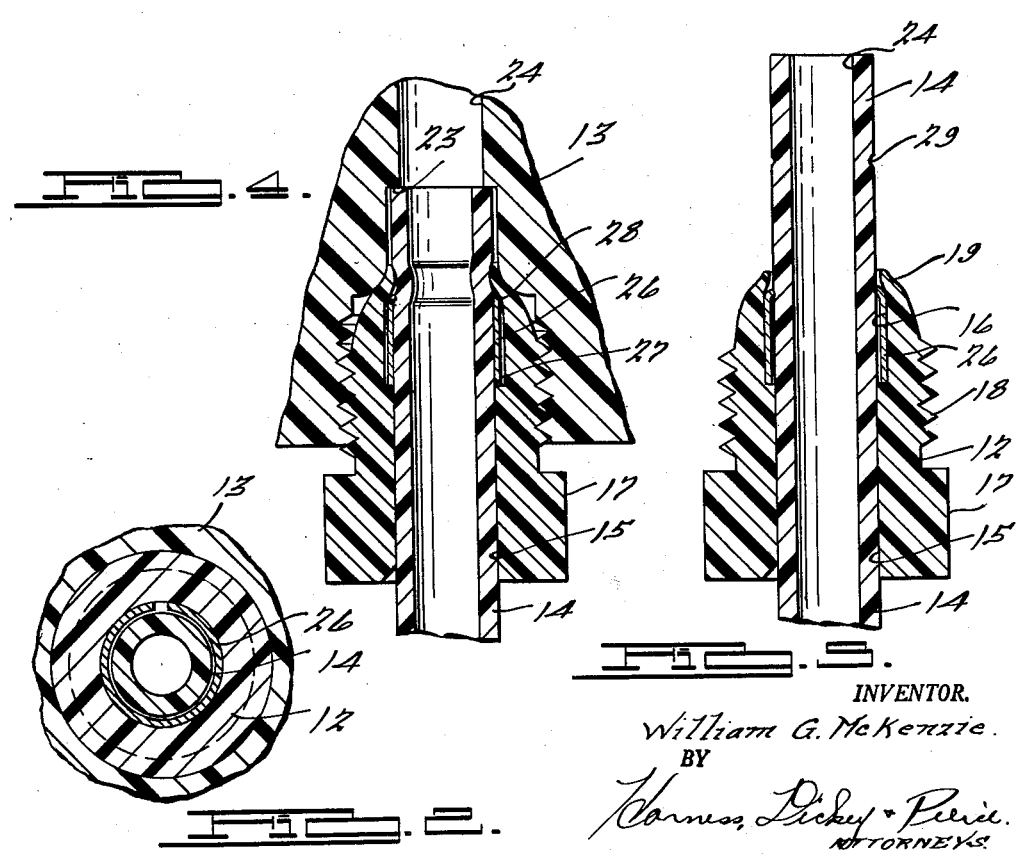
INVENTOR.
William G. McKenzie.
BY
Harness, Dickey & Pierce.
ATTORNEYS.

United States Patent Office 3,104,899
Patented Sept. 24, 1963

3,104,899
PLASTIC FITTING WITH METALLIC TUBING GRIPPING ELEMENT
William G. McKenzie, Racine, Wis., assignor to Walker Manufacturing Company, Racine, Wis., a corporation of Delaware
Filed Feb. 8, 1960, Ser. No. 7,327
1 Claim. (Cl. 285—343)

This invention relates to lubricating systems, and more particularly to fittings for connecting plastic tubing such as may be used in such systems.

The increasingly prevalent use of tubing fabricated of plastic materials, such as nylon or polyethylene, in lubricating and other systems has created problems with respect to the connection of such tubing to other components of the system. Metal fittings used for this purpose are relatively expensive, and the combination of a male metal fitting and a plastic female fitting does not permit proper gripping of the plastic tube unless special pre-crimping procedures are followed. Plastic male and female fittings of a conventional nature, when used together, are also unsatisfactory from the standpoint of proper tube gripping to prevent undesired removal of the tube from the fittings.

It is an object of the present invention to overcome the disadvantages of previously known fitting arrangements for use with plastic tubing, and to provide a novel and improved fitting construction which is less expensive than conventional metal fittings and yet provides proper sealing and tube gripping properties.

It is another object to provide an improved fitting construction of this nature in which a major portion of the fitting material is a plastic, but which nevertheless incorporates metal means for gripping the tubing.

It is also an object to provide an improved fitting construction of this nature which utilizes the sealing qualities of a plastic material to prevent leakage through the fitting and in which the components of the fitting construction can be re-used after separation.

Other objects, features, and advantages of the present invention will become apparent from the subsequent description, taken in conjunction with the accompanying drawings.

FIGURE 1 is a cross-sectional view of the novel and improved fitting construction of this invention shown in its assembled position, but before tightening;

FIGURE 2 is a cross sectional view taken along the line 2—2 of FIGURE 1 and showing the split nature of the metal sleeve;

FIGURE 3 is a view similar to FIGURE 1 showing the fitting after initial tightening;

FIGURE 4 is a cross-sectional view of the assembly after further tightening to crimp the metal sleeve into the tubing wall; and FIGURE 5 is a disassembled view of the plastic tubing together with the male fitting and metal sleeve, illustrating the condition of the parts after separation of the fitting.

In general terms, the invention comprises a male and a female fitting, at least the male fitting being fabricated of any of various soft or plastic materials, such as nylon or polyethylene. The male fitting, which is externally threaded, is adapted to be slipped over the end of a length of plastic tubing, and carries a thin split metal sleeve at its outer end portion which is immediately adjacent the tubing. The inner end of the internal thread of the female fitting slopes inwardly toward a bore which receives the end of the tubing, so that when the male fitting is threaded into the female fitting, the tapered end of the male fitting will be squeezed inwardly into sealing relation with the tubing. Further rotation of the male fitting will force the metal sleeve toward the seal area, and the sleeve will thus be crimped into the plastic tubing to create a gripping action which will prevent withdrawal of the tubing. When the male fitting is withdrawn, its partially deformed outer end will carry the sleeve along with it, the latter springing outwardly slightly. After cutting off the portion of the tubing which has been gripped, the male fitting and sleeve may be removed and re-used.

Referring more particularly to the drawings, the fitting is generally referred to at 11 and comprises a male fitting member 12 and a female fitting member 13, both of these members being fabricated of a suitable plastic material. These fitting members are adapted to be used in conjunction with a length of plastic tubing 14, such as is used in lubricating systems or the like. Male fitting member 12 is provided with a bore 15 of substantially the same diameter as the outside tubing diameter, and an enlarged bore 16 at the inner end of this member. The outer end of fitting member 12 is provided with an enlarged head 17 adapted to be gripped by an appropriate tool. The main portion of male fitting member 12 is provided with an external thread 18. The inner end 19 of member 12 is not threaded but is tapered in a slightly convex fashion to provide a relatively thin annular end for member 12.

Female fitting member 13, which may form a portion of a lubricating system manifold or other component, is provided with an internal thread 21 adapted to receive thread 18. The inner end of thread 21 is connected to a bore 22 of a diameter slightly larger than the outside diameter of tubing 14. A shoulder 23 is provided at the inner end of bore 22, a somewhat narrower bore or passageway 24 leading from shoulder 23. The portion 25 connecting threaded bore 21 with bore 22 is inclined in a convex manner, so that engagement of portion 19 of member 12 with portion 25 of member 13 will cause portion 19 to be squeezed inwardly.

A thin split metal sleeve 26 is disposed within bore 16 of member 12. This sleeve is somewhat shorter than the length of bore 16 and has an internal diameter which when unstressed is slightly larger than the external diameter of tube 14. The dimensions and material of sleeve 26 are such that it may be deformed or crimped when forced inwardly during assembly of the fitting.

In operation, the parts will be assembled as shown in FIGURE 1, with male fitting member 12 mounted on tubing 14, the end of the tubing engaging shoulder 23 of female fitting member 13. Upon threading of member 12 into member 13, sleeve 26 will be advanced along with member 12, and end portion 19 of member 12 will engage portion 25 of member 13. Rotation of member 12 will cause portion 19 to be forced inwardly against tubing 14 and into the relatively narrow annular space within bore 22, as shown in FIGURE 3. This action will result in a tight seal being formed by coaction of tubing 14, portion 19 of member 12, and portion 25 of member 13. The initial live contact between members 12 and 13 will insure the creation of sufficient force to cause flow of the plastic material of member 12.

Further rotation of member 12 will cause shoulder 27 at the end of bore 16 to force sleeve 26 toward the mutually engaging surfaces of portion 19 and tubing 14. Since portion 19 of member 12 is restrained against outward spreading movement by portion 25 of member 13, advancement of sleeve 26 will result in inward crimping of end portion 28 of the sleeve, as seen in FIGURE 4, the action being facilitated by the longitudinal slot in the sleeve. This deformation of sleeve 26 will cause its annular edge to bite into tubing 14, in an inclined manner. The result will be a gripping action on tubing 14 preventing a pull on the tubing from causing it to be withdrawn. The crimping action of sleeve 26 will also enhance the sealing action of the fitting assembly, since it will force the plastic portions of the assembly into closer contact.

During the crimping, the entire sleeve 26 will be reduced in diameter because of its split nature.

When it is desired to disconnect the members, male fitting member 12 may be unscrewed from female fitting member 13. The crimped end of sleeve 26 will remain in its deformed condition after unthreading of the parts, as seen in FIGURE 5, but the sleeve will expand somewhat within bore 16. Portion 19 of the male fitting member will retain its deformed position and will therefore tend to retain the sleeve. Member 12 and sleeve 26 may thus be slipped back on tubing 14, and if the tubing is then severed at the location 29 where sleeve 26 bit into it, member 12 and sleeve 26 may be removed. These parts are therefore re-usable with another length of tubing.

While it will be apparent that the preferred embodiment of the invention disclosed is well calculated to fulfill the objects above stated, it will be appreciated that the invention is susceptible to modification, variation and change without departing from the proper scope or fair meaning of the subjoined claim.

What is claimed is:

In a fitting assembly for use in conjunction with plastic tubing of predetermined outside diameter, threadably engageable male and female fitting members fabricated of a plastic material having approximately the physical properties of nylon, said female fitting member having a cylindrical bore with a shoulder at the inner end thereof for receiving the end of a length of plastic tubing, an outer surface on said female fitting member, an internal thread of larger diameter than said bore extending inwardly from said outer surface and coaxial with said bore, an inclined annular surface connecting the inner end of said thread and the outer end of said bore, said male fitting member comprising a tool-engageable portion at one end thereof, an externally threaded portion extending from said tool-engageable portion and adapted to threadably interfit with said internal thread, an inwardly tapered annular surface extending from said externally threaded portion to the other end of said male fitting member, a central bore in said male fitting member of substantially the same diameter as the outside tubing diameter, a counterbore extending into said bore from the tapered end of said male fitting member and terminating in a shoulder, and a split metal sleeve with a single longitudinal slot disposed within said counterbore and against said shoulder, the length of said sleeve being substantially shorter than the length of said counterbore, the wall thickness of said sleeve being less than the difference in radii between said bore and counterbore, the sleeve being formed of metal having resilient properties and having an internal diameter when unstressed which is slightly larger than the external tube diameter, whereby the sleeve will be initially expanded against the counterbore surface, the size of the gap formed by the walls of said slot when said sleeve is so expanded being greater than twice the radial distance between the inner sleeve surface and the external tubing surface, the relative axial lengths of said internal thread, inclined female fitting member surface, tapered male fitting member surface, counterbore and sleeve being such that upon threading of said male fitting member into said female fitting member said tapered surface will first be forced into sealing engagement with both said inclined surface and said external tubing surface and will upon further inward movement be forced radially inwardly against the adjacent end of said sleeve, said adjacent sleeve end being movable axially during such further inward movement past the juncture of said inclined surface and said internal thread whereby said sleeve end will be crimped inwardly against the external tubing surface to grip said tubing so as to counteract an outward pulling force thereon, substantially the entire length of said metal sleeve being moved radially inwardly away from the counterbore surface to said tubing surface during such crimping, crimping taking place before closure of said gap at the crimped sleeve end, the resilient properties of said sleeve being such that upon unthreading of said male fitting member said sleeve will expand radially against the counterbore surface thereby at least partially withdrawing the crimped end thereof from said external tubing surface, the physical properties of the material of said male fitting member being such that at least a portion of the end thereof having said tapered surface will partially retain its deformed position upon unscrewing of the male fitting member from the female fitting member and will therefore tend to retain said expanded sleeve, thereby permitting said sleeve to be drawn back along said tubing with said male fitting member.

References Cited in the file of this patent

UNITED STATES PATENTS

| 2,413,089 | Vaught | Dec. 24, 1946 |
| 2,517,705 | Paquin | Aug. 8, 1950 |
| 2,529,552 | Herold | Nov. 14, 1950 |
| 2,755,110 | Jacobs | July 17, 1956 |
| 2,908,512 | Morrow | Jan. 18, 1957 |
| 3,016,250 | Franck | Jan. 9, 1962 |

FOREIGN PATENTS

| 660,723 | Great Britain | Nov. 14, 1951 |
| 662,231 | Great Britain | Dec. 5, 1951 |
| 1,123,385 | France | Mar. 10, 1955 |